United States Patent
Chen et al.

(10) Patent No.: US 7,355,846 B1
(45) Date of Patent: Apr. 8, 2008

(54) MOUNTING DEVICE FOR DISK DRIVE

(75) Inventors: Yun-Lung Chen, Taipei Hsien (TW); Qing-Hao Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/672,963

(22) Filed: Feb. 9, 2007

(30) Foreign Application Priority Data

Dec. 8, 2006 (CN) .......................... 2006 2 0016246

(51) Int. Cl.
*G06F 1/16* (2006.01)

(52) U.S. Cl. .................. 361/685; 248/618; 360/133; 312/333

(58) Field of Classification Search ........... 248/221.11, 248/618, 633; 360/97.02, 133, 69, 75; 312/223.1, 312/333; 710/1, 100; 361/679–687, 724–727
See application file for complete search history.

(56) References Cited

U.S. PATENT DOCUMENTS

| 6,556,434 | B1 | 4/2003 | Chan et al. | |
| 6,795,309 | B2* | 9/2004 | Hartung et al. | 361/685 |
| 7,180,734 | B2* | 2/2007 | Jing | 361/685 |
| 2006/0002078 | A1* | 1/2006 | Jing | 361/685 |
| 2007/0121285 | A1* | 5/2007 | Liang et al. | 361/685 |

* cited by examiner

*Primary Examiner*—Hung Van Duong
(74) *Attorney, Agent, or Firm*—Wei Te Chung

(57) ABSTRACT

A mounting device (20) for a disk drive (80) has at least one retaining hole (81) defined in each one of two opposite sides thereof. The mounting device includes a receiving member (40), a retaining member (50), and a securing member (60). The receiving member includes a side wall (43) and a bottom wall (41). At least one fixing pin (433) is formed on the side wall. An elastic clip (413) is formed on the bottom wall with a protrusion (413) thereon. The retaining member is slidably attached to the receiving member. The retaining member includes a locking wall (51) and a retaining wall (53). At least one fixing pin (533) is formed on the retaining wall. The protrusion is engaged in an opening (511) defined in the locking wall. The securing member is attached to the retaining member. The securing member includes a pressing tab (613).

20 Claims, 7 Drawing Sheets

US 7,355,846 B1

MOUNTING DEVICE FOR DISK DRIVE

BACKGROUND OF THE INVENTION

1. Field of the Invention

The present invention relates to a mounting device, and more particularly to a mounting device for securely and simply retaining a disk drive in a computer enclosure.

2. Description of Related Art

Usually, at least one disk drive is secured in a computer for data storage use. The at least one disk drive is conventionally secured to the computer by a plurality of screws. The screws are small, and when securing or dismounting the disk drive the screws are easily dropped into the computer enclosure, which may result in damage.

Subsequently, some mounting devices for mounting the disk drive without screws are developed. A typical screwless disk drive mounting structure includes a casing, the casing having positioning units disposed in two opposite sidewalls thereof at different elevations, a plurality of carrier plates respectively hooked in the positioning units and adapted for holding disk drives in the casing at different elevations, a plurality of hold-down frames respectively pivoted to the positioning units at one side wall of the casing and adapted for holding down the corresponding disk drives on the carrier plates, and a plurality of locking handles respectively pivoted to the positioning units at one side wall of the casing and adapted for locking the hold-down frames and the disk drives. However, the above described-structure has two disadvantages. First, the mounting structure has many components, each component has a complicated structure, and thus the mounting structure is difficult to manufacture. Second, a large space is needed for rotating out the locking handle of the mounting structure.

What is needed, therefore, is to provide a mounting device for disk drives, having a simple structure, and is easy to use.

SUMMARY OF THE INVENTION

A mounting device for a disk drive has at least one retaining hole defined in each two opposite sides thereof. The mounting device includes a receiving member, a retaining member, and a securing member. The receiving member includes a side wall and a bottom wall. At least one fixing pin is formed on the side wall. An elastic clip is formed on the bottom wall with a protrusion thereon. The retaining member is slidably attached to the receiving member. The retaining member includes a locking wall and a retaining wall. At least one fixing pin is formed on the retaining wall. The protrusion of the elastic clip is engaged in an opening defined in the locking wall. A securing member is attached to the retaining member. The securing member includes a pressing tab. The pressing tab is aligned with the protrusion.

Other advantages and novel features of the present invention will become more apparent from the following detailed description of preferred embodiment when taken in conjunction with the accompanying drawings, in which:

DETAILED DESCRIPTION OF THE INVENTION

Figure 1:
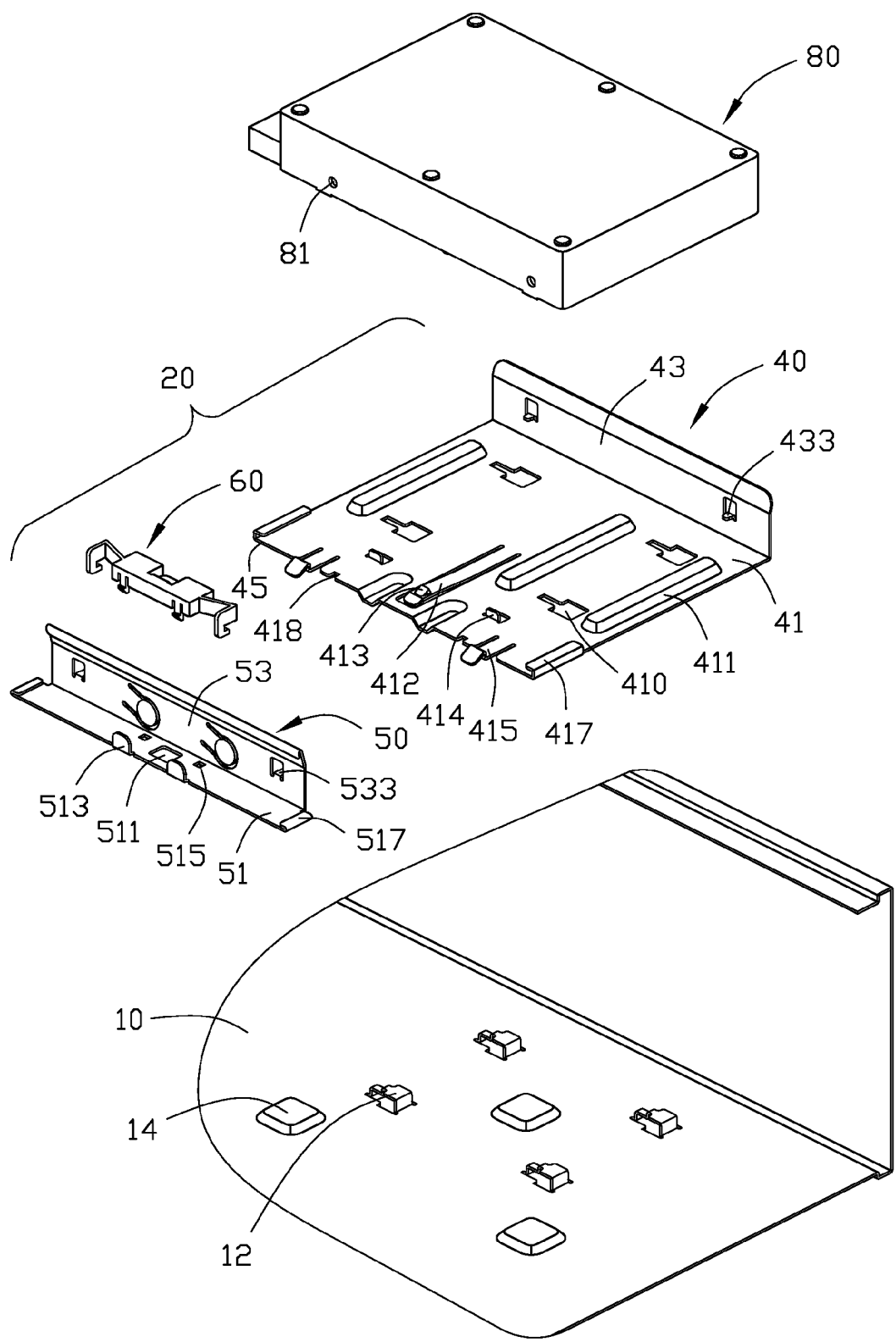
FIG. 1 is an exploded, isometric view of a mounting device for a disk drive according to a preferred embodiment of the present invention, the mounting device secured in a chassis, the mounting device including a receiving member, a retaining member, and a securing member.

Referring to FIG. 1, a mounting device 20 for a disk drive 80 of the preferred embodiment of the present invention is positioned in a computer chassis 10. The mounting device 20 includes a receiving member 40, a retaining member 50, and a securing member 60 attached to the retaining member 50. Two retaining holes 81 are respectively defined at each side of the disk drive 80.

The chassis 10 has three platforms 14 for positioning the receiving member 40 and four locking feet 12 for holding the receiving member 40. Understandably, the number of the platforms 14 can be variable according to designed remand.

The receiving member 40 has a bottom wall 41 and a side wall 43 perpendicularly extending up from an edge of the bottom wall 41. A pair of fixing pins 433 is inward formed on the side wall 43 corresponding to the retaining holes 81 on a side of the disk drive 80. Three spaced positioning plates 411 are formed in parallel on the bottom wall 41 for positioning the disk drive 80 and keeping a distance between the bottom wall 41 and the disk drive 80. Four T-shaped support openings 410 are defined in the bottom wall 41 respectively corresponding to the locking feet 12 of the chassis 10. Each support opening 410 has a wide portion and a narrow portion. The bottom wall 41 has a free edge 45 opposite to the side wall 43. An elastic clip 412 is formed on the bottom wall 41 perpendicular to the free edge 45 with a free distal end of the elastic clip 412 adjacent to the free edge 45. A protrusion 413 is formed on the free distal end of the elastic clip 412. A pair of lugs 414 is bent up from the bottom wall 41 a distance away from the free edge 45. The height of each lug 414 is smaller than the height of each positioning plate 411. A pair of elastic tongues 415 is formed at the bottom wall 41 and each tongue 415 has a Z-shaped end extending out from the free edge 45. The end has a slant face for guiding the retaining member 50 slidably attached to the receiving member 40 and a vertical face abutting the retaining member for preventing the retaining member 50 moving off from the receiving member 40. Two U-shaped directing portions 417 are respectively formed on opposite side edges of the bottom wall 41 for guiding the retaining member 50. A pair of cutouts 418 is defined at the free edge 45.

The retaining member 50 has an L shape and includes a locking wall 51 and a retaining wall 53 perpendicularly to the locking wall 51. The retaining wall 53 has a pair of fixing pins 533 corresponding to the retaining holes 81 on another side of the disk drive 80. Two stop tabs 513 are bent up from an outer edge of the locking wall 51. Two pairs of through holes 515 are defined in the locking wall 51. The holes of each pair of through holes are defined on a line from a corresponding stop tab 513 to the retaining wall 53. An opening 511 is defined in the locking wall 51 between the two pairs of through holes 515 for engaging with the protrusion 413 of the receiving member 40. Two sliding flanges 517 are bent over to slide into the directing portions 417 of the receiving member 40.

Figure 2:
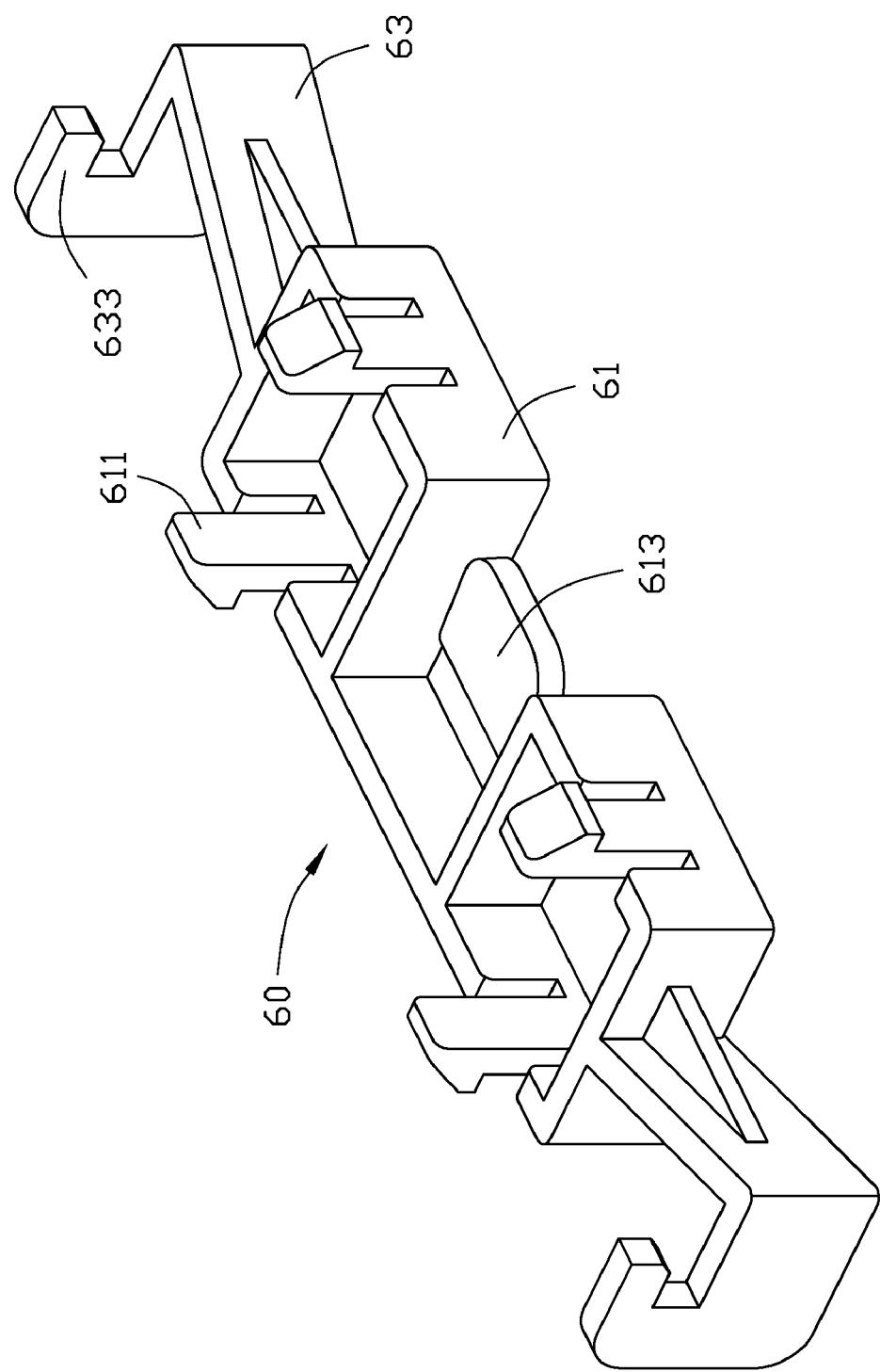
FIG. 2 is an enlarged view of the securing member of FIG. 1, but shown from another aspect.

Referring also to FIG. 2, the securing member 60 includes a body 61. Two wings 63 are respectively formed at opposite ends of the body 61. Four securing barbs 611 are formed on the body 61 corresponding to the through holes 515 of the retaining member 50 for holding the securing member 60 to the retaining member 50. A pressing tab 613 is formed on the body 61 corresponding to the protrusion 413 of the receiving member 40. Each wing 63 has a resilient portion connected to the body 61 and a hook 633 corresponding to each cutout 418 of the receiving member 40.

Figure 3:
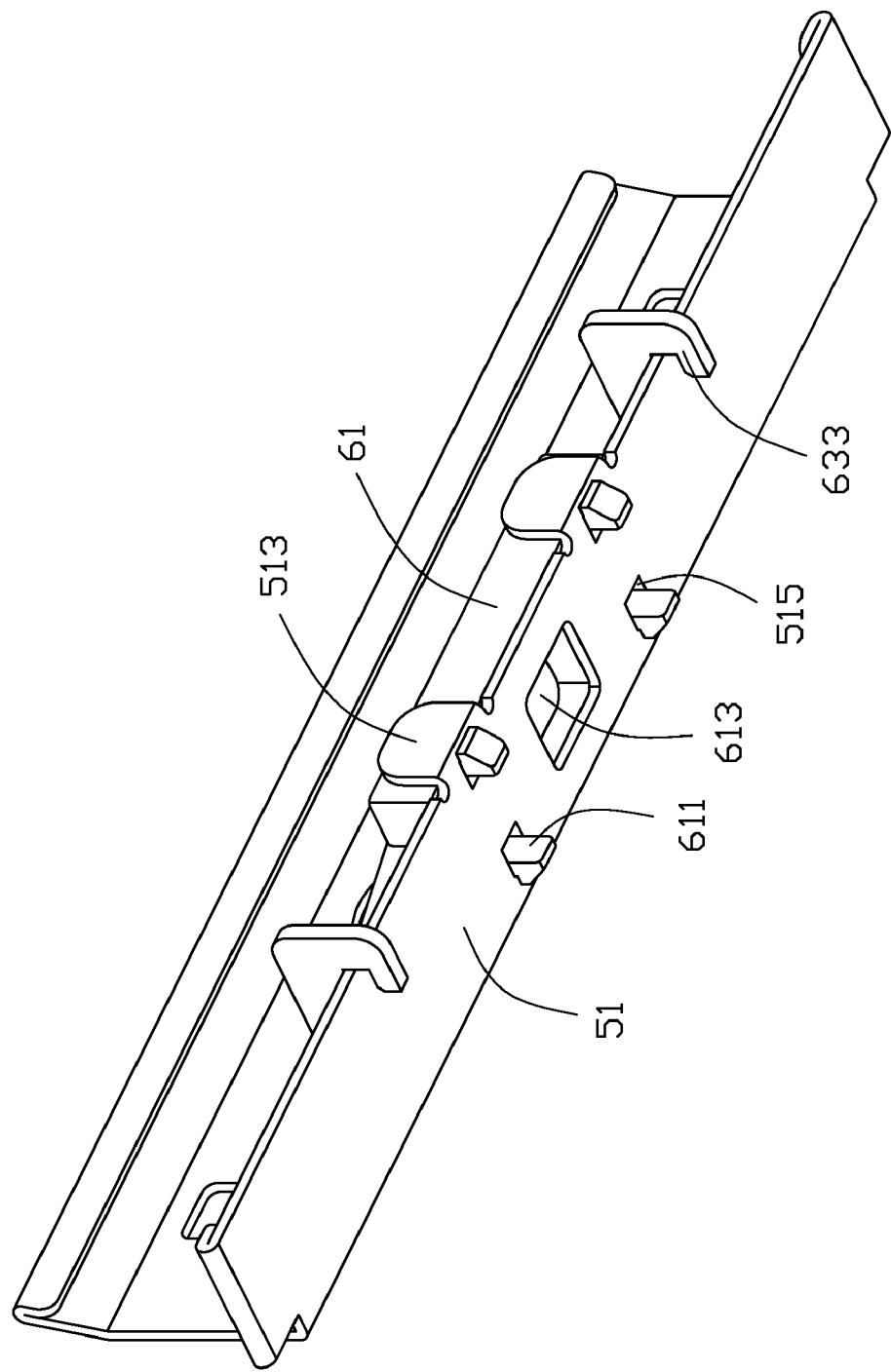
FIG. 3 is an assembled view of the retaining member and the securing member of FIG. 1.
Figure 4:
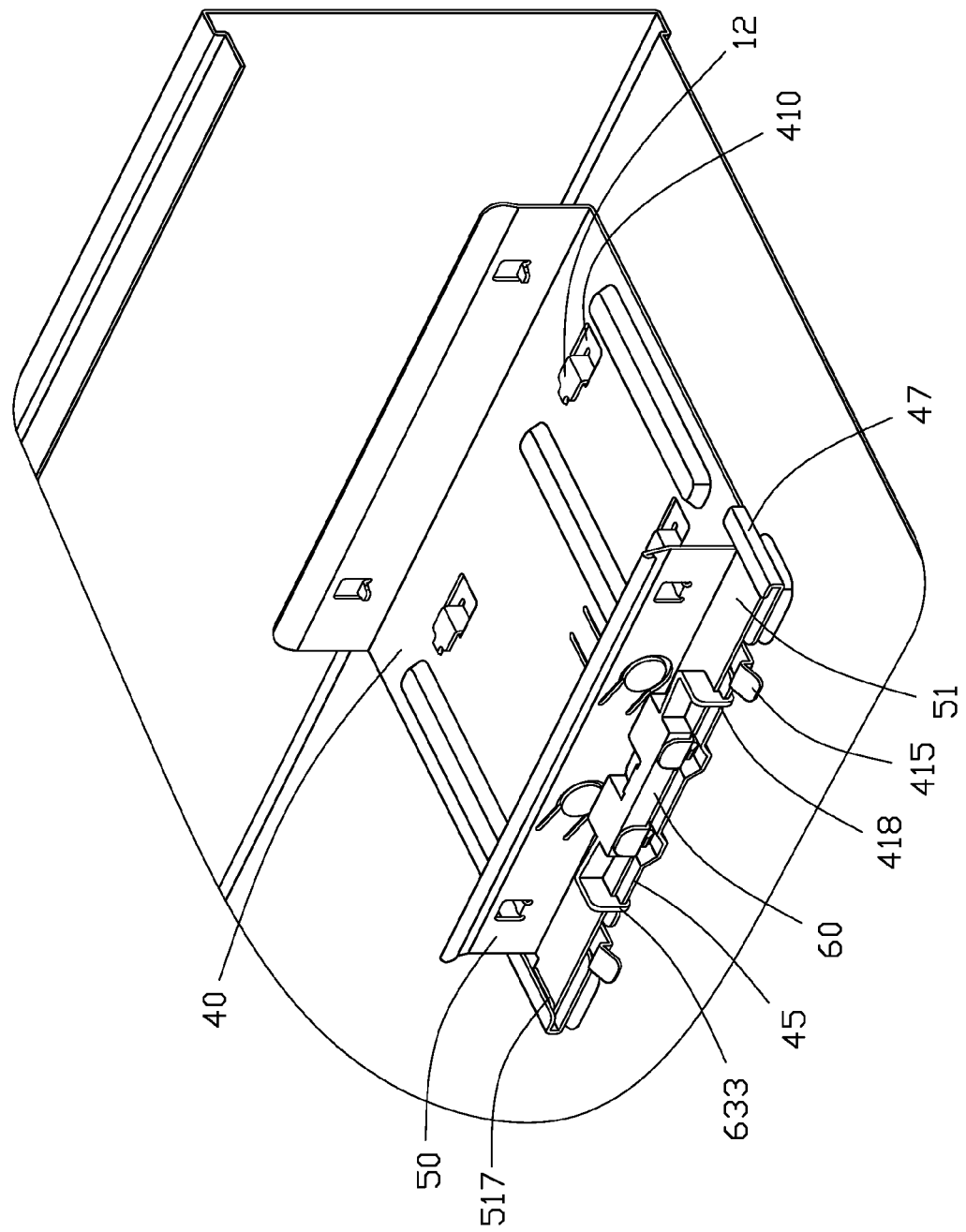
FIG. 4 is an assembled view of the mounting device and the chassis of FIG. 1.

Referring also to FIG. 3 and FIG. 4, when assembling the mounting device 20, the securing member 60 is first secured to the retaining member 50 with the four securing barbs 611 engaged in the corresponding through holes 515 of the retaining member 50 and the hooks 633 engaged with the outer edge of the locking wall 51. Then the retaining member 50 is slid onto the receiving member 40 with the sliding flanges 517 being directed into the directing portions 47 of the receiving member 40. The tongues 415 are pressed down under the locking wall 51 of the retaining member 50. When the retaining member 50 is totally slid onto the receiving member 40, the hooks 633 of the securing member 60 are engaged in the cutout 418 of the receiving member 40. The tongues 415 rebound and block the retaining member 50 from moving out. The mounting device 20 is then secured in the chassis 10 with each locking foot 12 extending through the wide portion of the corresponding support opening 410 to lock with the narrow portion. The retaining member 50 is movable relative to the side wall 43 to adjust the space between the side wall 43 and the retaining wall 53. The lugs 414 can restrict the movement of the retaining member 50.

Figure 5:
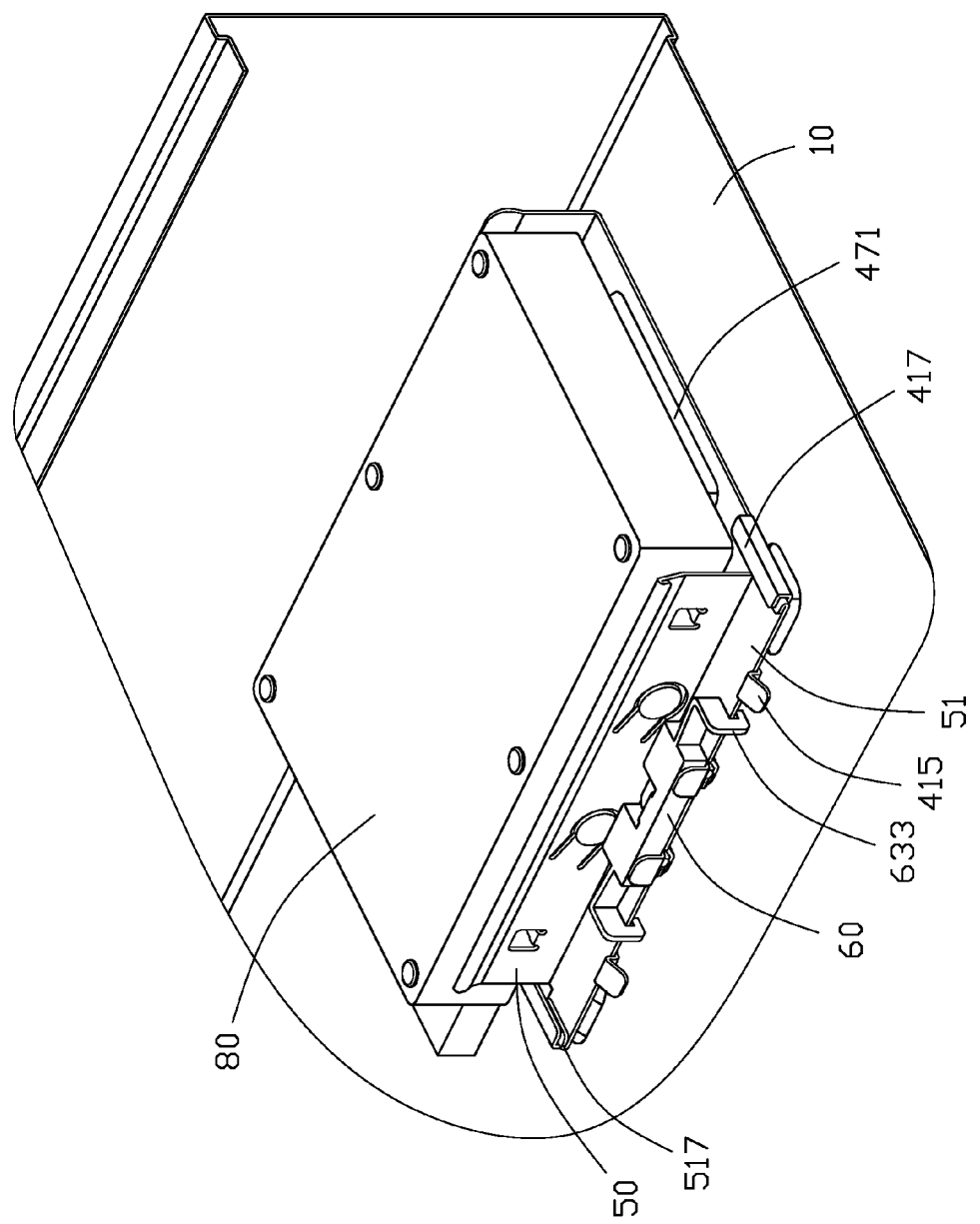
FIG. 5 is an assembled view of FIG. 1.
Figure 6:
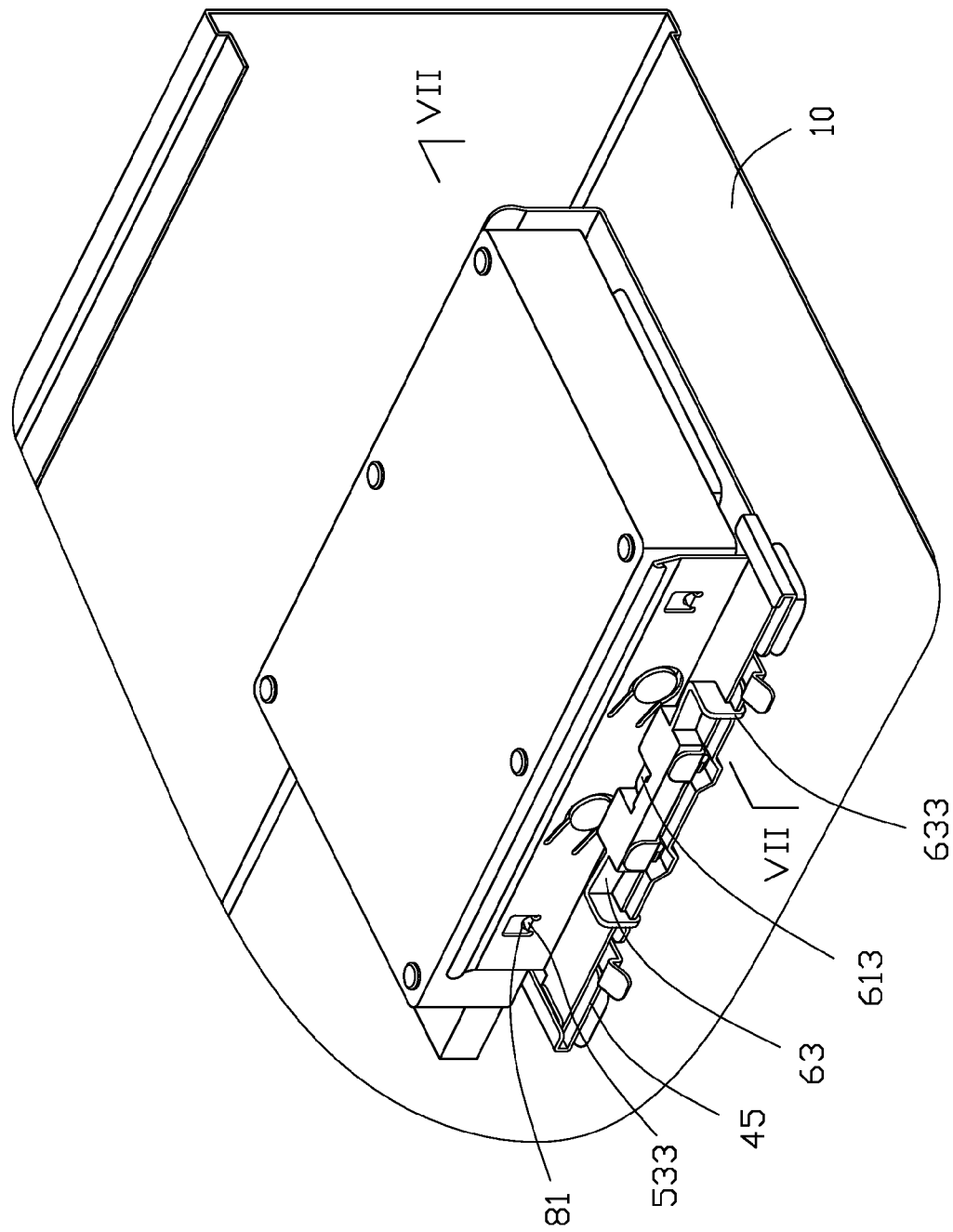
FIG. 6 is similar to FIG. 5, but the disk drive is in a secured position.
Figure 7:
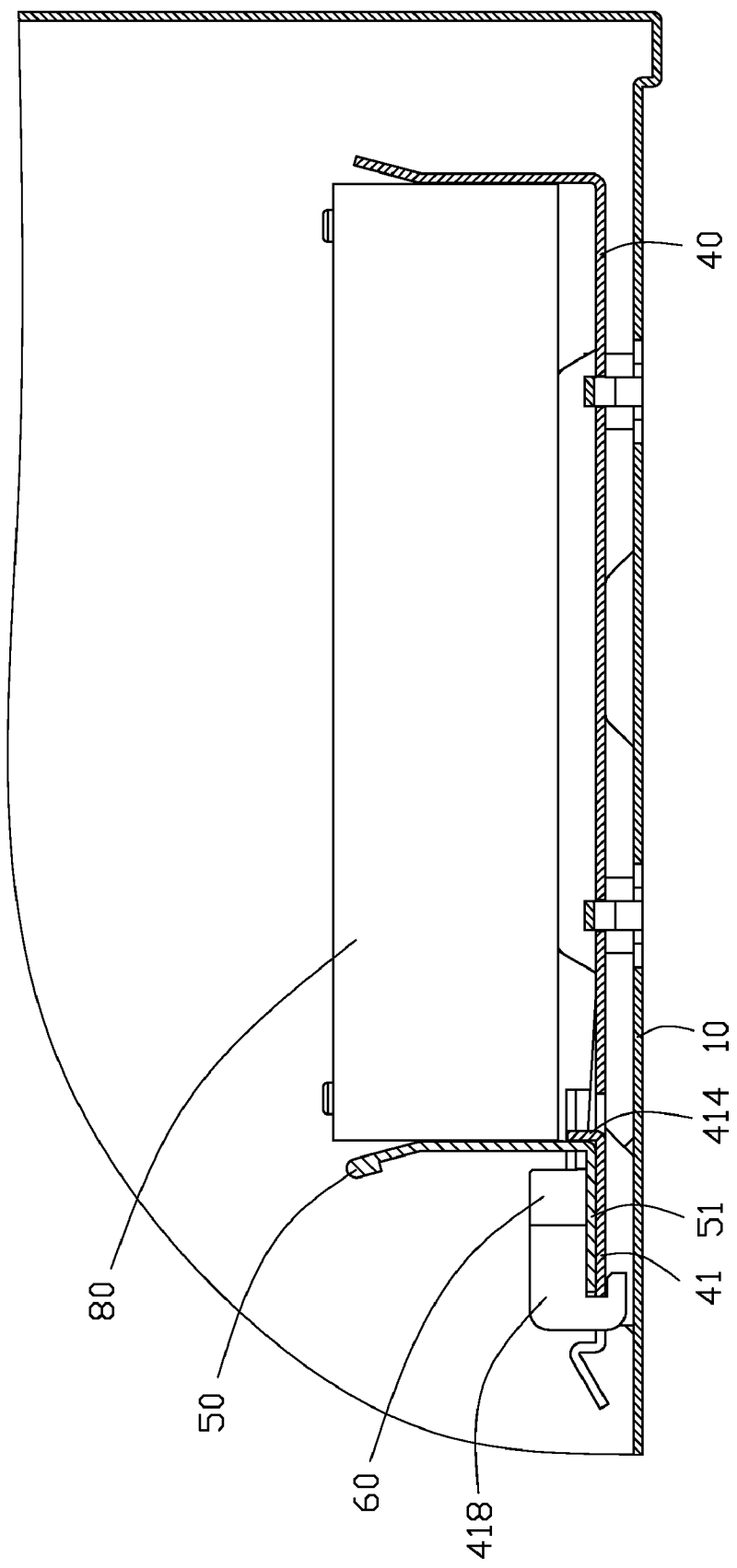
FIG. 7 is a sectional view from VII-VII of FIG. 6.

Referring also to FIG. 5 to FIG. 7, when securing the disk drive 80, the retaining member 50 is pulled away from the side wall 43 to allow easy insertion of the disk drive 80 into the space. The disk drive 80 is positioned on the receiving member 40 with the two fixing pins 433 engaged in the corresponding retaining holes 81 in one side thereof and the fixing pins 533 aligned with the corresponding retaining holes 81 in the opposite side thereof. The disk drive is positioned in a release position. Then the retaining member 50 is slid to the disk drive 80, and the fixing pins 533 are secured in the corresponding retaining holes 81 of the disk drive 80. The locking wall 51 abuts the protrusion 413 elastically deforming the elastic clip 412 of the receiving chassis 40. The wings 63 of the securing member 60 abut against the bottom wall 41 in the corresponding cutouts 418. Each wing 63 is thereby elastically deformed. When the fixing pins 533 are totally received in the corresponding retaining holes 81, the locking wall 51 releases the protrusion 413. The elastic clip 412 rebounds and the protrusion 413 is engaged in the opening 511 of the retaining member 50. The disk drive 80 is positioned in a securing position.

When disassembling the disk drive 80, the pressing tab 613 is pressed down to urge the protrusion 413 to disengage from the opening 511 of the retaining member 50. The wings 63 deform back to drive the retaining member 50 to move out. The fixing pins 533 disengage from the corresponding holes 81 of the disk drive 80. The disk drive 80 is then positioned in the release position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device for a disk drive, the disk drive having at least one retaining hole defined in each one of two opposite sides thereof, the mounting device comprising:

a receiving member for receiving the disk drive, the receiving member comprising a side wall configured for abutting one of the two sides of the disk drive, and a bottom wall, at least one fixing pin formed on the side wall configured for inserting into the at least one retaining hole defined in the one of the two sides of the disk drive, an elastic clip formed on the bottom wall with a protrusion thereon;

a retaining member slidably attached to the receiving member, the retaining member comprising a locking wall and a retaining wall configured for abutting the other one of the two sides of the disk drive, the locking wall abutting on the bottom wall of the receiving member with the elastic clip extending thereunder, at least one fixing pin formed on the retaining wall configured for being received in the at least one retaining hole defined in the other one of the two sides of the disk drive, the protrusion of the elastic clip engaging with an opening defined in the locking wall; and a securing member attached to the retaining member, the securing member comprising a pressing tab, the pressing tab aligned with the protrusion, wherein when the pressing tab is pressed down, the protrusion is urged by the pressing tab to disengage from the opening of the retaining member, so that the retaining member can be moved away from the disk drive, thereby disengaging the at least one fixing pin of the retaining wall from the disk drive.

2. The mounting device as described in claim 1, wherein at least one resilient wing is formed on the securing member, and the at least one wing has a hook thereon to abut against the bottom wall of the receiving member.

3. The mounting device as described in claim 1, wherein two U-shaped directing portions are formed at opposite sides of the bottom wall respectively, and the locking wall of the retaining member has two bent-over sliding flanges to slide into the corresponding directing portions.

4. The mounting device as described in claim 1, wherein at least one tongue is formed on a free edge of the bottom wall opposing the side wall to restrict movement of the retaining member away from the side wall.

5. The mounting device as described in claim 1, wherein at least one barb is formed on the securing member, the at least one barb engaging in at least one through hole defined in the locking wall.

6. The mounting device as described in claim 1, wherein at least two positioning plates are formed up on the bottom wall for supporting the disk drive, thereby keeping a distance between the bottom wall and the disk drive.

7. A mounting device for a disk drive, the disk drive having at least one retaining hole on each of two opposite sides thereof, the mounting device comprising:

a receiving member configured for receiving the disk drive, the receiving member comprising a side wall and a bottom wall, the bottom wall has a free edge opposite to the side wall, an elastic clip formed on the bottom wall with a protrusion thereon, the elastic clip being wavering in a direction perpendicular to the bottom wall;

a retaining member slidably attached to the receiving member for fixing the disk drive to the receiving member, the protrusion engaging in an opening being defined in the retaining member; and a securing member attached to the retaining member, the securing member comprising at least one resilient wing, the at least one wing abutting against the free edge of the bottom wall and being elastically deformed, wherein when the protrusion is disengaged from the opening of the retaining member, the at least one wing rebounds to drive the retaining member to move away from the disk drive.

8. The mounting device as described in claim 7, wherein a pressing tab is formed on the securing member for urging the protrusion to disengage from the opening of the retaining member.

9. The mounting device as described in claim 7, wherein the at least one wing has a hook thereon to hold onto the free edge of the bottom wall of the receiving member.

10. The mounting device as described in claim 7, wherein two U-shaped directing portions are formed at opposite sides of the bottom wall respectively, and the locking wall of the retaining member has a pair of bent-over sliding flanges to slide into the directing portions.

11. The mounting device as described in claim 7, wherein at least one tongue is formed on the free edge of the bottom wall to restrict movement of the retaining member away from the receiving member.

12. The mounting device as described in claim 7, wherein at least one barb is formed on the securing member, and the at least one barb engages in at least one through hole defined in the retaining member.

13. The mounting device as described in claim 7, wherein at least two positioning plates are formed up on the bottom wall for supporting the disk drive, thereby keeping a distance between the bottom wall and the disk drive.

14. A mounting device assembly comprising:

a receiving member comprising a bottom wall and a side wall extending from the bottom wall, an elastic clip being formed at the bottom wall and being wavering in an up-and-down direction;

a retaining member slidably attached to the receiving member and engaging with the elastic clip in a left-and-right direction, the retaining member comprising a locking wall slidably attached to the bottom wall of the receiving member and a retaining wall parallel to the side wall extending from the locking wall;

a data storage device located on the bottom wall and sandwiched between the side wall and the retaining wall;

a securing member being secured to the retaining member, the securing member comprising a pressing portion and at least one resilient wing being elastically deformed and abutting against the bottom wall of the receiving member, the pressing portion being pressable to urge the elastic clip to release the retaining member such that the at least one resilient wing rebounds to move the retaining member away from the data storage device.

15. The mounting device assembly as claimed in claim 14, wherein a plurality of holes is defined in opposite sides of the data storage device and a plurality of retaining pins is formed in the side wall and the retaining wall and inserted into the respective holes for retaining the data storage device to the receiving member in a front-and-back direction and the up-and-down direction.

16. The mounting device assembly as claimed in claim 14, wherein the retaining member is movable along the left-and-right direction between a release position at which the elastic clip is disengaged from the retaining member and the data storage device is freely movable away from the receiving member, and a securing position at which the elastic clip is engaged with the retaining member and the data storage device is firmly secured to the receiving member and the retaining member.

17. The mounting device assembly as claimed in claim 16, wherein the receiving member further comprises an elastic tongue with a stop portion formed at a free end thereof, the stop portion having a slant face for guiding the retaining member slidably attached to the receiving member and a vertical face abutting the retaining member at the release position for preventing the retaining member moving off from the receiving member.

18. The mounting device assembly as claimed in claim 16, further comprising a chassis, wherein the chassis has at least one platform configured for supporting the bottom wall of the receiving member thereon and at least one locking portion, and a T-shaped opening having a wide portion and a narrow portion is defined in the bottom wall, the at least one locking portion being extending through the wide portion of the T-shaped opening to lock with the narrow portion.

19. The mounting device assembly as claimed in claim 16, wherein the locking wall of the retaining member defines an opening and the elastic clip has a protrusion formed at one end thereof, the protrusion engaging with the retaining member in the opening at the securing position.

20. The mounting device assembly as claimed in claim 16, wherein the securing member comprises a body at which the pressing portion is formed, the at least one elastic wing extending slantly from the body, a hook being formed at a free end of the at least one wing and snapping a free edge of the bottom wall opposing the side wall at the securing position.

* * * * *